United States Patent
Cho et al.

(10) Patent No.: US 11,226,523 B2
(45) Date of Patent: *Jan. 18, 2022

(54) DISPLAY DEVICE AND METHOD FOR MANUFACTURING THE SAME

(71) Applicant: Samsung Display Co., Ltd., Yongin-Si (KR)

(72) Inventors: Youngmin Cho, Seongnam-si (KR); Minseok Kim, Cheongju-si (KR); Jonghwan Kim, Busan (KR); Yongyoul Cho, Yongin-si (KR)

(73) Assignee: SAMSUNG DISPLAY CO., LTD., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,984

(22) Filed: Jul. 13, 2020

(65) Prior Publication Data

US 2020/0341321 A1    Oct. 29, 2020

Related U.S. Application Data

(63) Continuation of application No. 15/607,856, filed on May 30, 2017, now Pat. No. 10,747,073.

(30) Foreign Application Priority Data

Jun. 8, 2016  (KR) .................. 10-2016-0071268

(51) Int. Cl.
*G02F 1/1345* (2006.01)
*G02F 1/1362* (2006.01)
*G02F 1/1368* (2006.01)

(52) U.S. Cl.
CPC ........ *G02F 1/13452* (2013.01); *G02F 1/1368* (2013.01); *G02F 1/136286* (2013.01); *G02F 1/136295* (2021.01); *G02F 2202/28* (2013.01)

(58) Field of Classification Search
CPC ........... G02F 1/13452; G02F 1/136286; G02F 1/1368; G02F 2202/28;
(Continued)

(56) References Cited

U.S. PATENT DOCUMENTS

| 4,735,847 A | 4/1988 | Fujiwara et al. |
| 5,032,006 A | 7/1991 | Grupp et al. |

(Continued)

FOREIGN PATENT DOCUMENTS

| CN | 103372730 | 10/2013 |
| CN | 104181734 | 12/2014 |

(Continued)

*Primary Examiner* — Shan Liu
(74) *Attorney, Agent, or Firm* — Kile Park Reed & Houtteman PLLC

(57) ABSTRACT

A display device includes a display panel, a flexible film, and an adhesion layer. The display panel includes a first substrate which includes a pad electrode connected to a signal line, a second substrate, and a metal electrode electrically connected to the pad electrode and on a side surface of the display panel. The flexible film includes a line electrode electrically connected to the metal electrode and attached to the side surface of the display panel. A connection electrode electrically connects the metal electrode to the line electrode. The adhesion layer is disposed between the flexible film and the side surface of the display panel. The connection electrode includes solder particles in melted form.

13 Claims, 16 Drawing Sheets

(58) Field of Classification Search
CPC ....... G02F 2001/136295; G02F 1/0121; G02F 1/0327; G02F 1/076; G02F 1/133; G02F 1/13306; G02F 1/1345; G02F 1/13454; G02F 1/13458; G02F 2001/133388; G02F 2001/133612; G02F 2001/13456; H05K 3/361; G09G 2300/0426; G09G 2300/0408; G09G 3/3655; G09G 3/3674; G09G 3/3685; G09G 2290/00; G09G 2320/0223; G09G 2300/0421; G09G 3/36; H01L 23/48; H01L 23/49572; H01L 2224/50; H01L 2224/79; H01L 2224/86; H01L 2225/06579; H01L 2224/107; H01L 24/50
USPC .................................................. 349/149–152
See application file for complete search history.

(56) References Cited

U.S. PATENT DOCUMENTS

| | | | |
|---|---|---|---|
| 5,320,272 | A | 6/1994 | Melton et al. |
| 9,632,381 | B2 | 4/2017 | Kang et al. |
| 10,747,073 | B2 * | 8/2020 | Cho .................... G02F 1/13452 |
| 2002/0071085 | A1 | 6/2002 | Huang et al. |
| 2011/0115364 | A1 | 5/2011 | Kim |
| 2012/0073869 | A1 | 3/2012 | Kishi et al. |
| 2013/0258632 | A1 | 10/2013 | Ebe et al. |
| 2013/0277092 | A1 | 10/2013 | Ebe et al. |
| 2014/0339574 | A1 | 11/2014 | Kang et al. |
| 2016/0377905 | A1 | 12/2016 | Choi et al. |
| 2017/0005083 | A1 | 1/2017 | Choi et al. |
| 2017/0082900 | A1 | 3/2017 | Kong et al. |

FOREIGN PATENT DOCUMENTS

| | | |
|---|---|---|
| CN | 104678625 | 6/2015 |
| CN | 105223747 | 1/2016 |
| KR | 10-2008-0032412 | 4/2008 |
| KR | 10-2013-0117103 | 10/2013 |
| KR | 10-2014-0115044 | 9/2014 |
| KR | 10-2014-0115045 | 9/2014 |
| KR | 10-2014-0115111 | 9/2014 |
| KR | 10-2014-0136233 | 11/2014 |
| KR | 10-2015-0047711 | 5/2015 |
| KR | 10-2015-0072743 | 6/2015 |

* cited by examiner

DISPLAY DEVICE AND METHOD FOR MANUFACTURING THE SAME

CROSS-REFERENCE TO RELATED APPLICATION(S)

This is a continuation application based on currently pending U.S. patent application Ser. No. 15/607,856, filed on May 30, 2017, the disclosure of which is incorporated herein by reference in its entirety. U.S. patent application Ser. No. 15/607,856 claims priority benefit of Korean Patent Application No. 10-2016-0071268, filed on Jun. 8, 2016 in the Korean Intellectual Property Office, the disclosure of which is incorporated herein by reference in its entirety for all purposes.

BACKGROUND

1. Field

One or more embodiments described herein relate to a display device and a method for manufacturing a display device.

2. Description of the Related Art

Various post-processing methods may be used to electrically connect a display panel to a driving chip in a module assembly. Examples include a chip-on-glass (COG) mounting method and a tape automated bonding (TAB) mounting method. In a COG mounting method, a driving chip is directly mounted on a gate region and a data region which supplies electrical signals to the display panel, and the driving chip is bonded to the display panel using an anisotropic conductive film (ACF). In one type of TAB mounting method, a tape carrier package on which a driving chip is mounted is bonded to a display panel. In another TAB mounting method, the display panel is bonded to one end of the tape carrier package and a printed circuit board is bonded to the other end of the tape carrier package.

SUMMARY

In accordance with one or more embodiments, a display device includes a display panel including a first substrate which includes a signal line and a pad electrode connected to the signal line, a second substrate facing the first substrate, and a metal electrode electrically connected to the pad electrode and on a side surface of the display panel; a flexible film including a line electrode electrically connected to the metal electrode, the flexible film attached to the side surface of the display panel; and a conductive adhesion member including a connection electrode electrically connecting the metal electrode to the line electrode, the conductive adhesion member attaching the flexible film to the surface of the display panel, wherein the connection electrode included the solder particles in melted form.

The metal electrode may include a metallic material including silver or carbon. The conductive adhesion member may include an adhesion layer having adhesion property and the solder particles in the adhesion layer. The solder particles may include at least one of a tin-silver alloy, a tin-copper alloy, a tin-silver-copper alloy, a tin-bismuth alloy, a tin-zinc alloy, a tin-lead alloy, a tin-lead-silver alloy, a tin-bismuth-silver alloy, or a tin-indium alloy. The solder particles may include tin-bismuth alloy, the tin may be in a weight percentage ranging from about 37 wt % to about 47 wt % with respect to a total weight of the solder particles, and the bismuth may be in a weight percentage ranging from about 53 wt % to about 63 wt % with respect to a total weight of the solder particles.

The conductive adhesion member may include a conductive adhesion film or conductive adhesion paste. The first substrate may include a first base surface having a first surface opposite to a second surface and side surfaces connecting the first and second surfaces, the signal line and the pad electrode may be on one of the first surface and the second surface, and the metal electrode may directly contact the pad electrode. The first substrate may include an insulation layer on the signal line and the pad electrode and the insulation layer may include an opening pattern exposing an end of the pad electrode. The metal electrode may be on a side surface corresponding to the side surface of the display panel among the side surfaces of the first base substrate and may extend to a top surface of the pad electrode exposed through the opening pattern.

The flexible film may include a base film on which the line electrode is disposed and a cover film covering the line electrode. The base film may include a first section corresponding to a side surface of the first substrate and a second section corresponding to a side surface of the second substrate and outside the first section, and the line electrode is in the first section and does not extend to the second section. The conductive adhesion member may correspond to the first and second sections of the base film.

The second substrate may include a second base substrate; a common electrode on the second base substrate; and an insulation structure on the common electrode and adjacent to the metal electrode to extend along the side surface of the display panel. The second substrate may include a second base substrate and a common electrode on the second base substrate, and the common electrode may not overlap the metal electrode between the first and second substrates.

In accordance with one or more other embodiments, a method for manufacturing a display device includes forming a display panel by coupling a first substrate including a signal line and a pad electrode extending from the signal line to a second substrate facing the first substrate; forming a metal electrode on a side surface of the display panel and electrically connected to the pad electrode; forming a conductive adhesion member on the metal electrode, the conductive adhesion member including a base resin and solder particles dispersed in the base resin; aligning a flexible film with the display panel, the conductive adhesion member between the flexible film and the display panel and the flexible film including a line electrode electrically connected to the metal electrode; and applying heat to the conductive adhesion member to form a connection electrode electrically connecting the metal electrode to the line electrode, wherein the heat is applied at a temperature greater than a melting point of the solder particles. The metal electrode may include a metallic material including silver or carbon.

The solder particles may include at least one selected of a tin-silver alloy, a tin-copper alloy, a tin-silver-copper alloy, a tin-bismuth alloy, a tin-zinc alloy, a tin-lead alloy, a tin-lead-silver alloy, a tin-bismuth-silver alloy, or a tin-indium alloy. The solder particles may include tin-bismuth alloy, the tin may be in a weight percentage ranging from about 37 wt % to about 47 wt % with respect to a total weight of the solder particles, and the bismuth may be in a weight percentage ranging from about 53 wt % to about 63 wt % with respect to a total weight of the solder particles.

The melting point may be in a temperature range of about 100° C. to about 250° C. The base resin may include a thermoplastic resin.

BRIEF DESCRIPTION OF THE DRAWINGS

Features will become apparent to those of skill in the art by describing in detail exemplary embodiments with reference to the attached drawings in which:

FIGS. 10A-10F are viewed in a first direction;

FIGS. 10D-10F are viewed in a second direction;

DETAILED DESCRIPTION

Figure 1:
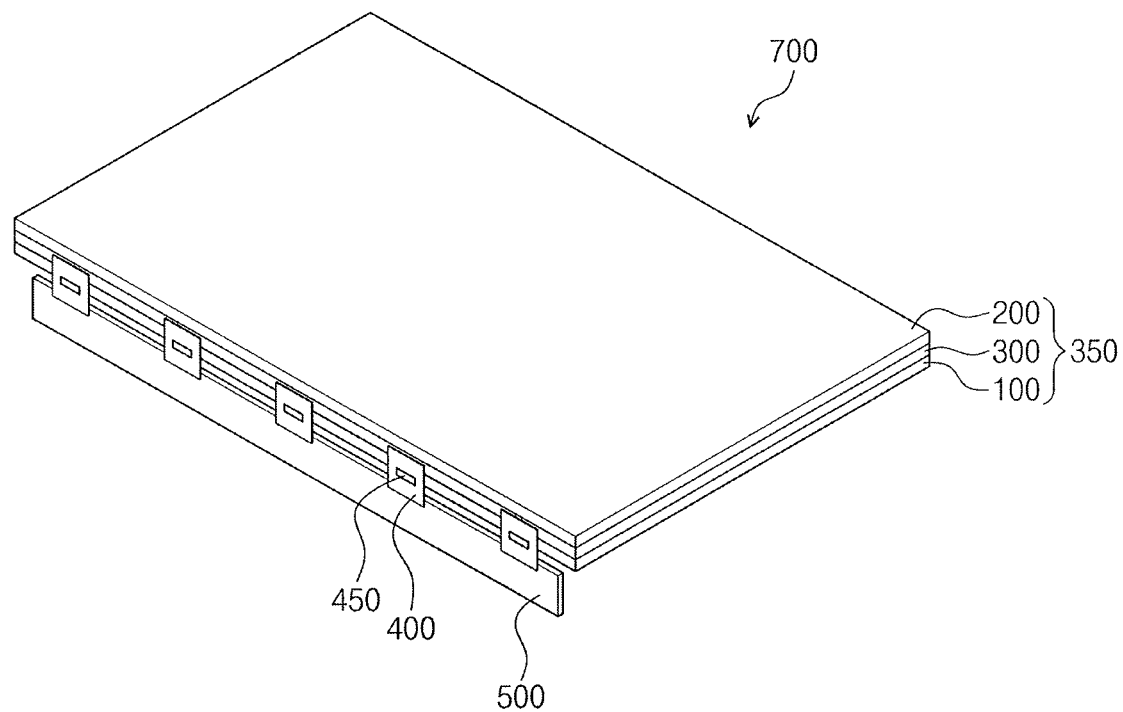
FIG. 1 illustrates an embodiment of a display device.

Example embodiments will now be described with reference to the accompanying drawings; however, they may be embodied in different forms and should not be construed as limited to the embodiments herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
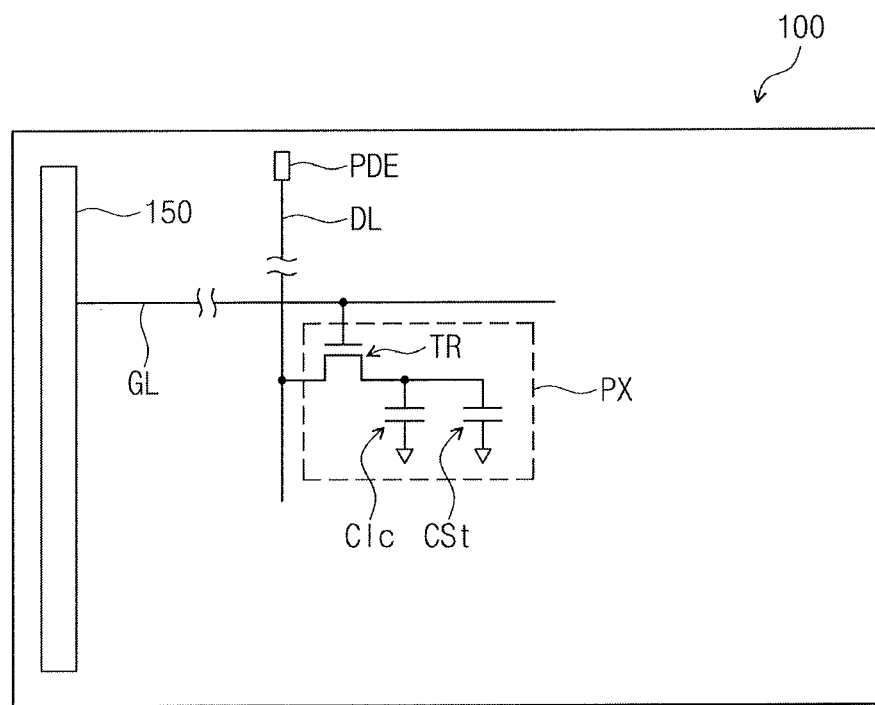
FIG. 2 illustrates an embodiment of a first substrate in FIG. 1.

FIG. 1 illustrates an embodiment of a display device 700, and FIG. 2 is a plan view of an embodiment of a first substrate 100 in FIG. 1. Referring to FIG. 1, a display device 700 includes a display panel 350 for displaying an image and a flexible film 400 attached on a side surface of the display panel 350. The display panel 350 may be, for example, an organic light emitting display panel, a liquid crystal display panel, a plasma display panel, an electrophoretic display panel, a microelectromechanical system (MEMS) display panel, or an electrowetting display panel. The display device 700 will be described as a liquid display panel for illustrative purposes.

The display panel 350 includes a first substrate 100, a second substrate 200 coupled to face the first substrate 100, and a liquid crystal layer 300 between the first substrate 100 and the second substrate 200. A pixel PX, and a signal line connected to the pixel PX, are in the first substrate 100. A plurality of such pixels PX may be in the first substrate 100 in a matrix form along with corresponding signal lines.

The pixel PX may include a thin film transistor TR, a liquid crystal capacitor Clc, and a storage capacitor Cst. The signal line may include a gate line GL and a data line DL. The gate line GL is connected to a gate electrode of the thin film transistor TR. The data line DL is connected to a source electrode of the thin film transistor TR. A drain electrode of the thin film transistor TR is connected to a first electrode (e.g., a pixel electrode) of the liquid crystal capacitor Clc.

According to an embodiment, the first substrate 100 may further include a gate driving circuit 150 that supplies a gate signal to the gate line GL. The gate driving circuit 150 may be simultaneously disposed on the first substrate 100 through the same process as the thin film transistor TR. The first substrate 100 may further include a pad electrode PDE extending from the data line DL. The pad electrode PDE may extend from one end of the data line DL and be disposed on an edge region of the first substrate.

Referring to again FIG. 1, the flexible film 400 may have one side attached on the side surface of the display panel 350 and the other side attached on a printed circuit board 500. In the current embodiment, the side surface of the display panel 350 may correspond to a surface of the first substrate 100. A driving chip 450 may be mounted on the flexible film 400. A data driving circuit for supplying data signals to the data line DL may be built in the driving chip 450. The printed circuit board 500 may supply an image data signal and a data control signal to the driving chip 450 and supply a gate control signal to the driving circuit 150.

The flexible film 400 may serve to transmit signals from the printed circuit board 500 to the driving chip 450 or to the display panel 350. Also, the flexible film 400 may transmit the data signals output from the driving chip 450 to the display panel 350. To supply the signals to a side of the display panel 350, the flexible film 400 may be electrically connected to the display panel 350.

Figure 3:
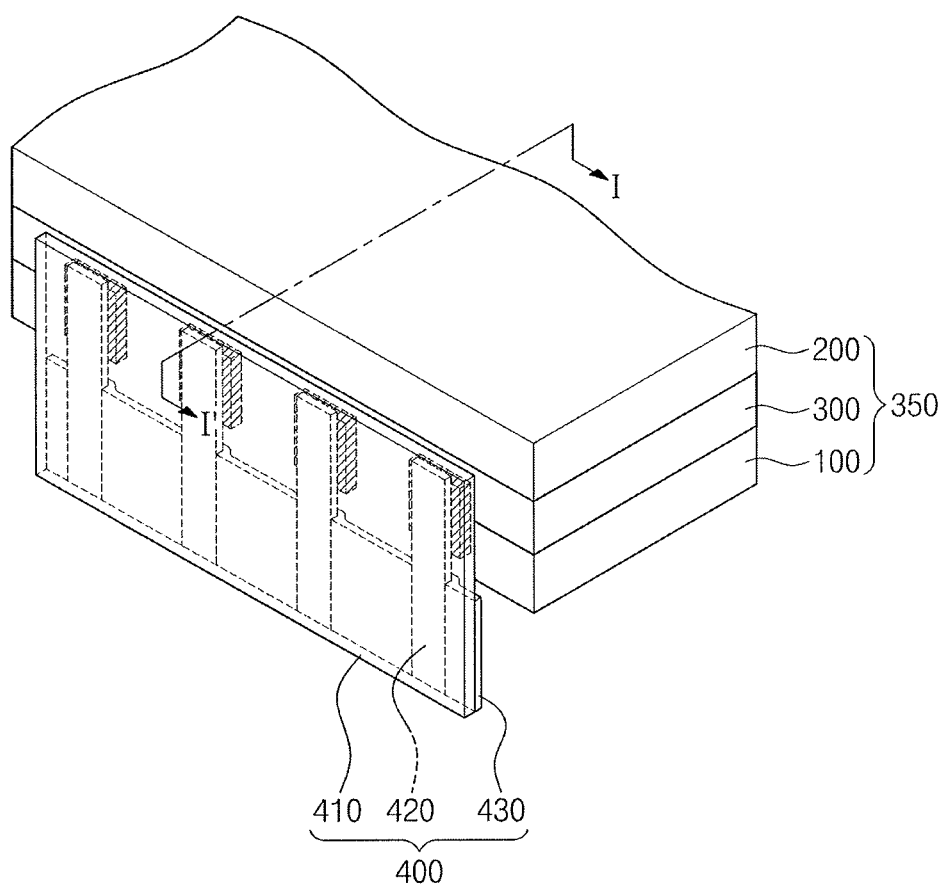
FIG. 3 illustrates an enlarged partial view of the display panel in FIG. 1.
Figure 4:
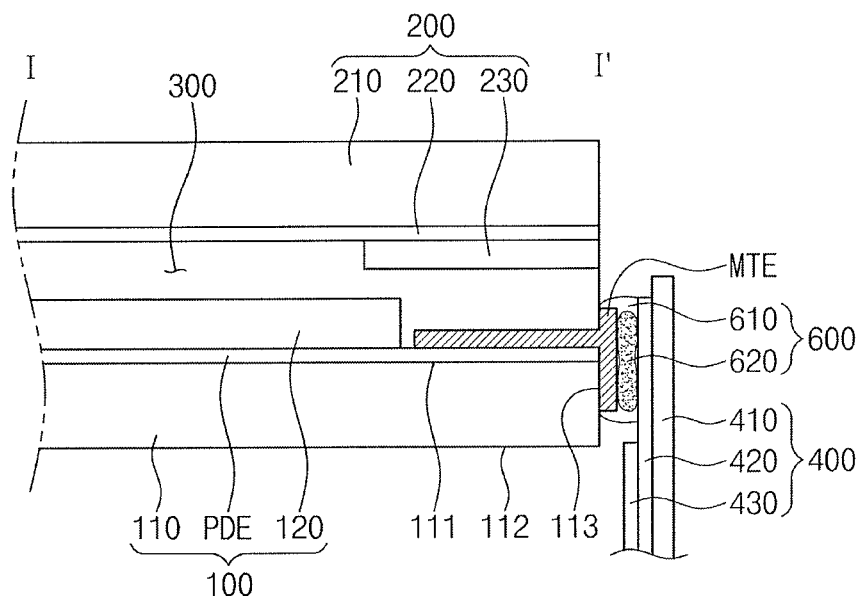
FIG. 4 illustrates a cross-sectional view taken along line I-I' in FIG. 3.

FIG. 3 illustrates a partial enlarged perspective view of the display panel 700 in FIG. 1, and FIG. 4 is a cross-sectional view taken along line I-I' in FIG. 3. Referring to FIGS. 3 and 4, the first substrate 100 includes a first base substrate 110. The first base substrate 110 includes a first surface 111, a second surface 112 opposite to the first surface 111, and a side surface 113 connecting the first surface 111 to the second surface 112. According to an embodiment, the first surface 111 may be an inner surface facing the second substrate 200. The second surface 112 may be an outer surface opposite to the first surface 111.

The data line DL and the pad electrode PDE in FIG. 2 are on the first surface 111. The display panel 350 further includes a metal electrode MTE on the side surface 113 of the first base substrate 110 and electrically connected to the pad electrode PDE. According to an embodiment, the metal electrode MTE may include a metal material made of, for example, silver (Ag) or carbon (C).

The pad electrode PDE is partially covered by an insulation layer 120. The pad electrode PDE may have an end adjacent to the side surface 113 of the first base substrate 110 and exposed through an opening pattern of the insulation layer 120. The metal electrode MTE is on the end of the pad electrode PDE exposed through the opening pattern of the insulation layer 120. The metal electrode MTE may directly contact the pad electrode PDE.

The flexible film 400 may be parallel to a side surface of the first substrate 100. The flexible film 400 includes a base film 410, a line electrode 420 on the base film 410, and a cover film 430 for covering the line electrode 420. The base film 410 may be made of a flexible material, for example, a polyimide. The line electrode 420 may be connected to the driving chip (e.g., 450 in FIG. 1) to receive the signal output from the driving chip 450. The line electrode 420 has an end exposed by the cover film 430 to face the metal electrode MTE. The line electrode 420 may be made of a metal material, e.g., copper (Cu), silver (Ag), gold (Au), or aluminum (Al).

The display device 700 further includes a conductive adhesive member 600 between the side surface of the first substrate 100 and the flexible film 400. The conductive adhesion member 600 includes an adhesion layer 610 having adhesion property and solder particles in the adhesion layer 610. The solder particles are melted to form a connection electrode 620 for electrically connecting the metal electrode MTE to the line electrode 420.

The adhesion layer 610 includes a material having an adhesion force to physically fix the flexible film 400 to the side surface of the first substrate 100. The adhesion layer 610 may include, for example, an acrylic polymer resin and/or a thermoplastic resin. For example, the thermoplastic resin may include, for example, a vinyl acetate resin, a styrene resin, an ethylene-vinyl acetate co-polymer resin, or a styrene-butadiene co-polymer resin. In one embodiment, the thermoplastic resin may include a polyester resin.

The solder particles may be dispersed in the polymer resin. The solder particles may be, for example, a tin alloy particle formed by alloying tin and at least one of copper, bismuth, zinc, or indium. The solder particles may be indium alloy particles formed by alloying indium and at least one of silver, copper, bismuth, zinc, or tin. For example, the solder particles may include at least one of a tin-silver alloy, a tin-copper alloy, a tin-silver-copper alloy, a tin-bismuth alloy, a tin-zinc alloy, a tin-lead alloy, a tin-lead-silver alloy, a tin-bismuth-silver alloy, or a tin-indium alloy.

The solder particles are melted by heat to form the connection electrode 620 for electrically connecting the metal electrode MTE to the line electrode 420. Thus, the connection electrode 620 may have a random shape, e.g., the connection electrode 620 may not have a regular shape but may have an irregular shape. In another embodiment, the connection electrode 620 may have a predetermined regular shape.

The second substrate 200 facing the first substrate 100 includes a second base substrate 210 parallel to the first base substrate 110. A common electrode 220 may be on the second base substrate 210. The common electrode 220 may correspond to a second electrode of the liquid crystal capacitor Clc in FIG. 2. The common electrode 220 may be on the entire surface of the second base substrate 210. The common electrode 220 may be provided in a side of the first substrate 100. In another embodiment, the common electrode 220 may be provided on a side of the second substrate 200, for example, as illustrated in FIGS. 3 and 4.

When the common electrode 220 is on a side of the second substrate 200, the second substrate 200 may further include an insulation structure 230 disposed in an extension direction of the side surface of the first substrate 100, on which the flexible film 400 is attached. The insulation structure 230 is on the common electrode 220 and covers an end of the common electrode 220. The insulation structure 230 may include an inorganic insulation material or an organic insulation material. In one embodiment, the insulation structure 230 may be formed of an organic BM. Thus, the insulation structure 230 may prevent the common electrode 220 from contacting the metal electrode MTE in a process step of forming the metal electrode MTE.

Figure 5:
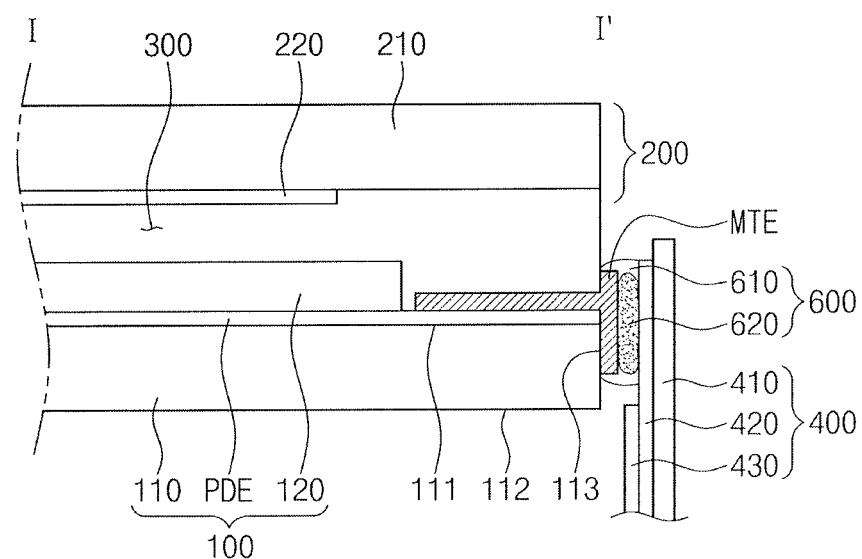
FIG. 5 illustrates another embodiment of a display device.

FIG. 5 illustrates a cross-sectional view of another embodiment of a display device. Referring to FIG. 5, a second substrate 200 includes a common electrode 220 on a second base substrate 210. When the display device 700 operates in a vertical electric field alignment mode, in which the common electrode 220 is patterned to be disposed on a display area of the display panel 350, the structure of the common electrode 220 may have a portion removed at an end of the display panel 350 on which the metal electrode MTE is disposed.

Thus, when the display panel 350 is viewed in a plane, the common electrode 220 may not to overlap the metal electrode MTE. As described above, when a portion of the common electrode 220 is removed from an area overlapping an area on which the metal electrode MTE is disposed, a failure in which the metal electrode MTE contacts the common electrode 220 may be prevented during a process step of forming the metal electrode MTE.

Figure 6:
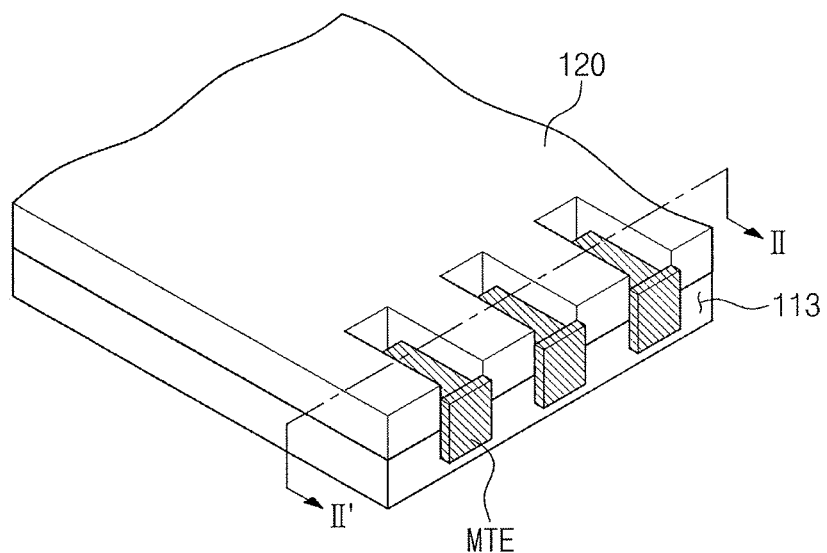
FIG. 6 illustrates an embodiment of a first substrate in FIG. 4.

FIGS. 4 and 5 illustrate a structure in which the common electrode 220 is on the second substrate 200. The common electrode 220 is applicable to a vertical electric field alignment mode or a twisted nematic mode. In another embodiment, the common electrode 220 may be in the first substrate 100. When the display device 700 operates in a horizontal electric field alignment mode, the common electrode 220 may be in the first substrate 100 with the pixel electrode. FIG. 6 is a perspective view of a first substrate illustrated in FIG. 4, and FIG. 7 is a cross-sectional view taken along line II-II of FIG. 6.

Figure 7:
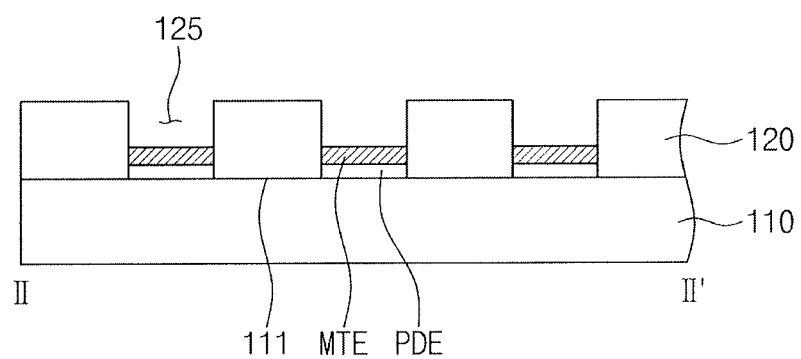
FIG. 7 illustrates a cross-sectional view taken along line II-IF in FIG. 6.

Referring to FIGS. 6 and 7, the pad electrode PDE is on the first surface 111 of the first base substrate 110. A plurality of pad electrodes PDE may be provided in at least one embodiment. The insulation layer 120 is between the pad electrodes PDE. The insulation layer 120 may include, for example, an organic insulation material.

The insulation layer 120 may have opening patterns 125 exposing a top surface of the pad electrodes PDE. A plurality of metal electrodes MTE may be provided in one-to-one correspondence with the pad electrodes PDE. The metal electrodes MTE are on the pad electrodes PDE and extend to the side surface of the first base substrate 110. Thus, the metal electrodes MTE may have a portion (e.g., a side surface electrode) on the side surface 113 of the first base substrate 110 and exposed to the outside even after the first and second substrates 100 and 200 are coupled to face each other.

The metal electrodes MTE on the side surface 113 have the side surface electrode electrically connected to the flexible film 400 through the conductive adhesion member 600.

Figure 8:
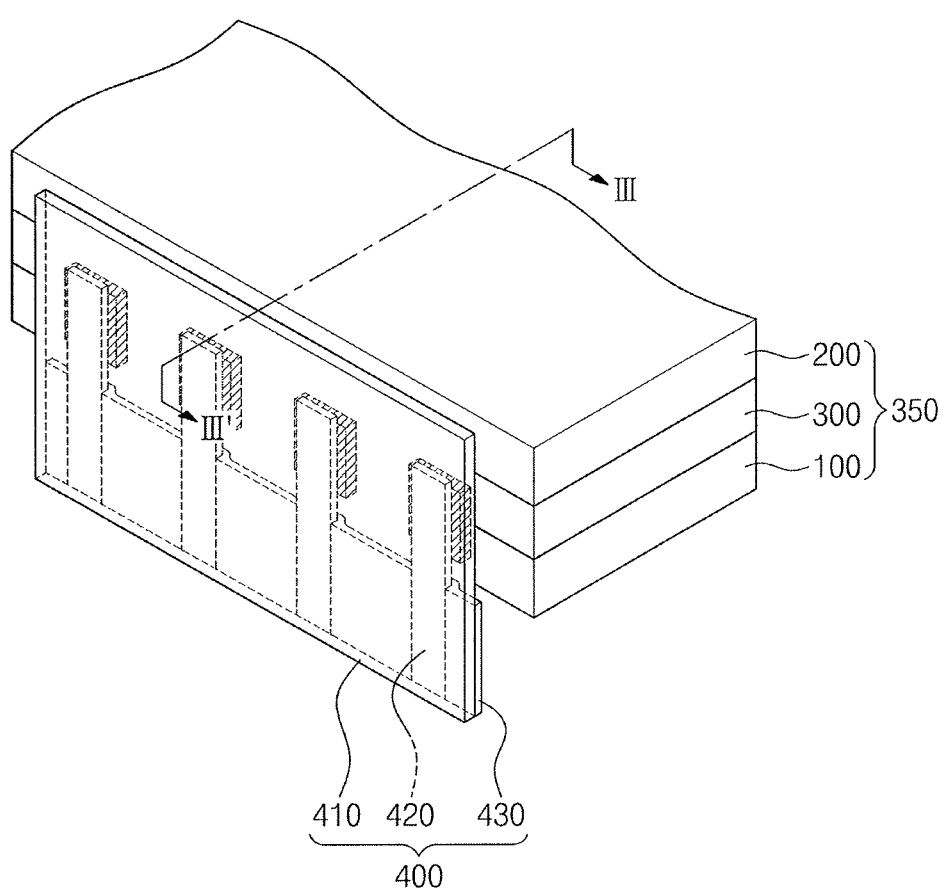
FIG. 8 illustrates another embodiment of a display device.
Figure 9:
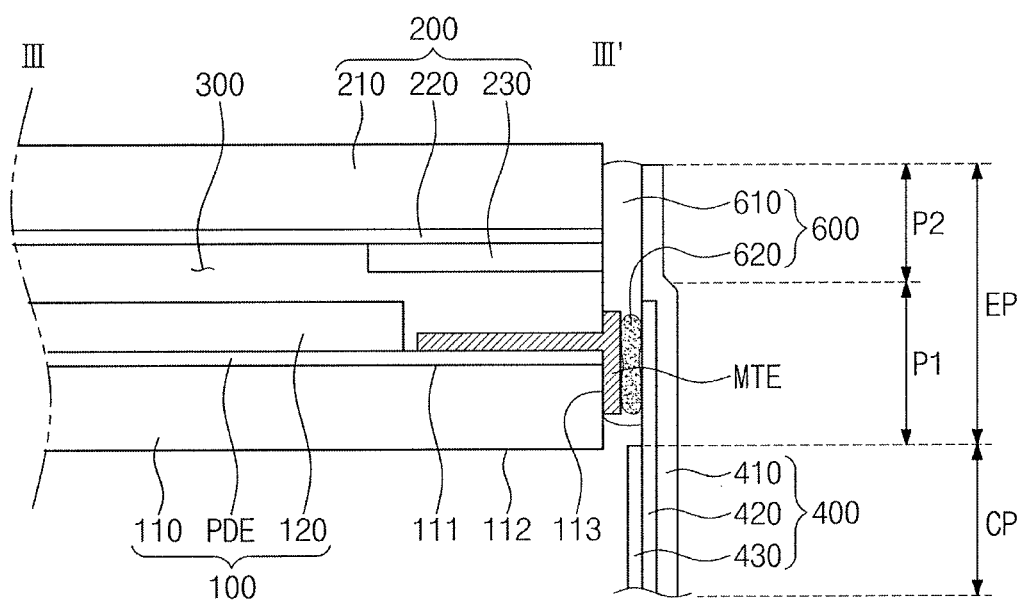
FIG. 9 illustrates a cross-sectional view taken along line in FIG. 8.

FIG. 8 illustrates a perspective view of another embodiment a display device, and FIG. 9 illustrates a cross-sectional view taken along line III-III' of FIG. 8. Referring to FIGS. 8 and 9, a flexible film 400 includes a base film 410 divided into an central section CP facing a cover film 430 and an end section EP that does not face the cover film 430. The end section EP includes first and second sections P1 and P2. The first section P1 is a region corresponding to the side surface of the first substrate 100. The second section P2 is a region which corresponds to a side surface of the second substrate 200 and is defined outside the first section P1 with respect to the central section CP.

The line electrode 420 is in the central section CP and the first section P1, but does not extend to the second section P2. For example, the line electrode 420 does not extend up to the second section P2 so that the line electrode 420 does not electrically contact the common electrode 220 in the second substrate 200.

The conductive adhesion member 600 corresponds to the first and second sections P1 and P2 of the base film 410. Thus, when the flexible film 400 is physically fixed to the surface of the display panel 350, an adhesion portion increases in area to reinforce adhesion force. The side surface of the display panel 350 may include all surfaces of the first and second substrates 100 and 200.

Since the line electrode 420 does not extend to the second section P2, a connection electrode 620 of the conductive adhesion material 600 is only between the line electrode 420 and the metal electrode MTE in the first section P1. The conductive adhesion member 600 may include the solder particles, which agglomerate on the metal electrode MTE and the line electrode 420 at a melting temperature to form the connection electrode 620.

A surface of the common electrode 220 may be exposed to the outside to contact the conductive adhesion member 600 in the second section P2. Since solder particles agglomerate on an electrode made of only a metal material, the solder particles do not agglomerate even at temperatures over the melting temperature.

FIGS. 10A-10F illustrate various stages of an embodiment of a method for manufacturing a display device viewed in a first direction A1. FIGS. 11A-11F are side views of a display panel manufactured by the method.

Figure 10A:
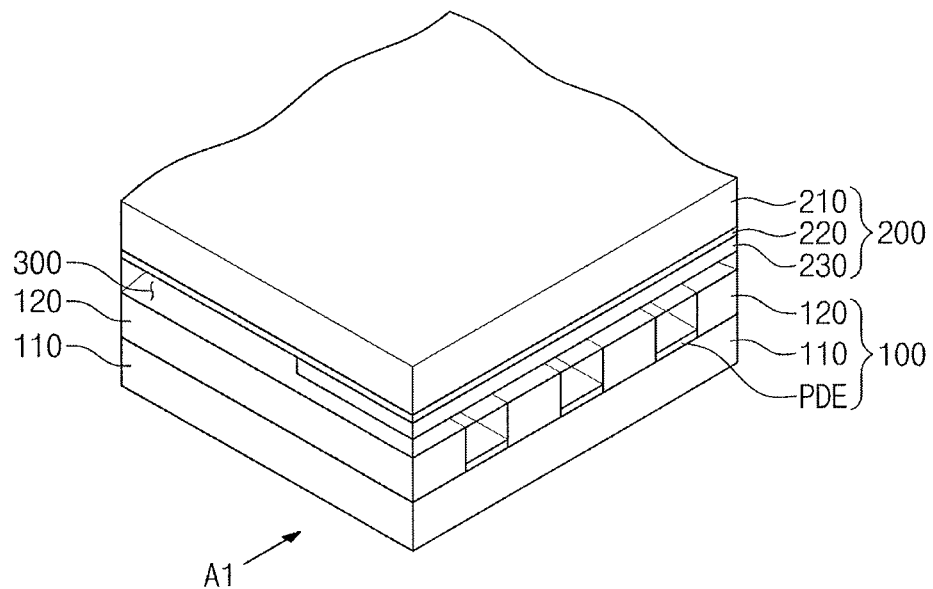
FIGS. 10A-10F illustrate stages of an embodiment of a manufacturing method for a display device.
Figure 11A:
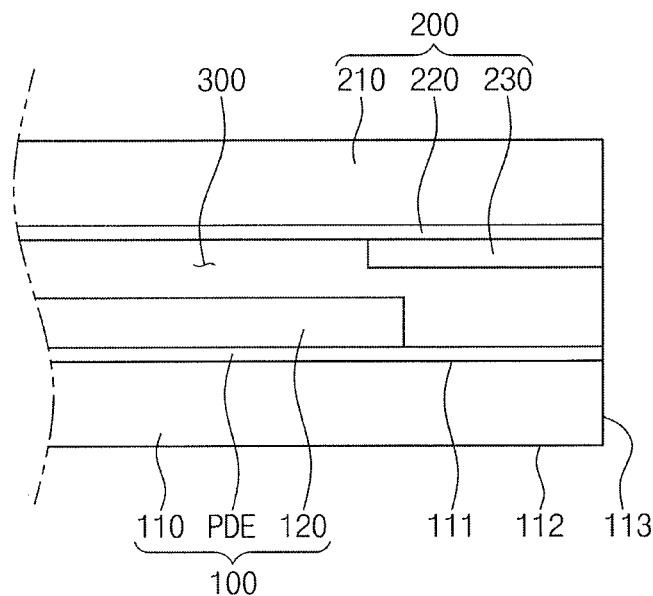
FIGS. 11A-11F illustrate side views when

Referring to FIGS. 10A and 11A, when the manufacturing of the first substrate 100 is completed and the manufacturing of the second substrate 200 is completed, the first and second substrates 100 and 200 are coupled to face each other. A liquid crystal layer 300 is formed between the first and second substrates 100 and 200. A space between the first and second substrates 100 and 200 may be sealed by a sealing member to seal the liquid crystal layer 300.

According to an embodiment, the first substrate 100 is coupled to the second substrate 200 before the metal electrode (e.g., MTE of FIG. 4) is formed. The metal electrode MTE may be formed, for example, on the first substrate 100 after the first and second substrates 100 and 200 are coupled to each other.

Then, an opening space is formed in the first substrate 100 to expose a top surface of the pad electrode PDE, so that the metal electrode MTE is allowed to directly contact the pad electrode PDE. The pad electrode PDE is exposed through the opening pattern 125 in the insulation layer 120 to form the opening space. The opening space may be secured even when the sealing member is above the first substrate 100. The opening space may be formed to have a tunnel shape.

Figure 10B:
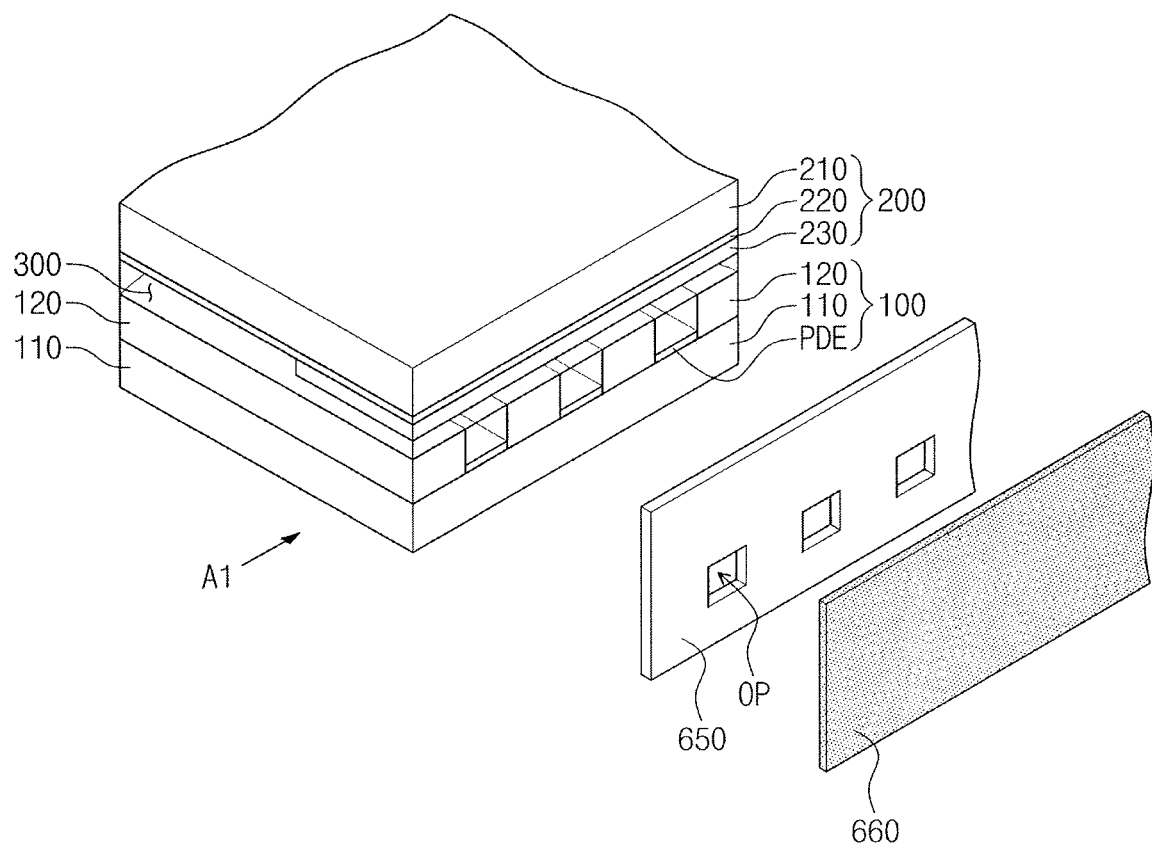
Figure 11B:
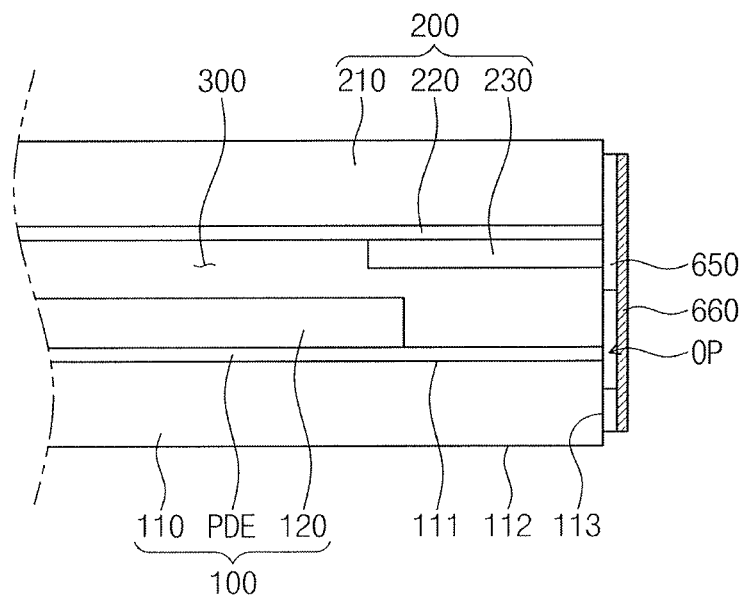

Referring to FIGS. 10B and 11B, a mask 650 for a silk screen printing is disposed on the side surface of the display panel 350. The mask 650 has openings OP arranged along the side surface of the display panel 350. The mask 650 may be aligned so that the space in which the pad electrode PDE of the display panel 350 is exposed corresponds to the openings OP.

Conductive paste 660 may be provided on an outer surface of the mask 650. The conductive paste 660 may be uniformly applied on the outer surface. The conductive paste 660 may include a metallic material, e.g., silver or carbon. The conductive paste 660 may be pushed (e.g., by a squeezer) to insert the conductive paste 660 into the opening space of the display panel 350. The squeezer may move along the side surface of the display panel 350 while pushing the conductive paste 660.

The conductive paste 660 directly contacts the pad electrode PDE. Since the opening space is formed in a tunnel shape, the conductive paste 660 may be introduced to the opening space by a capillary phenomenon and formed after moving to the top surface of the pad electrode PDE. The conductive paste 660 may be formed along the side surface 113 of the first base substrate 110.

Figure 10C:
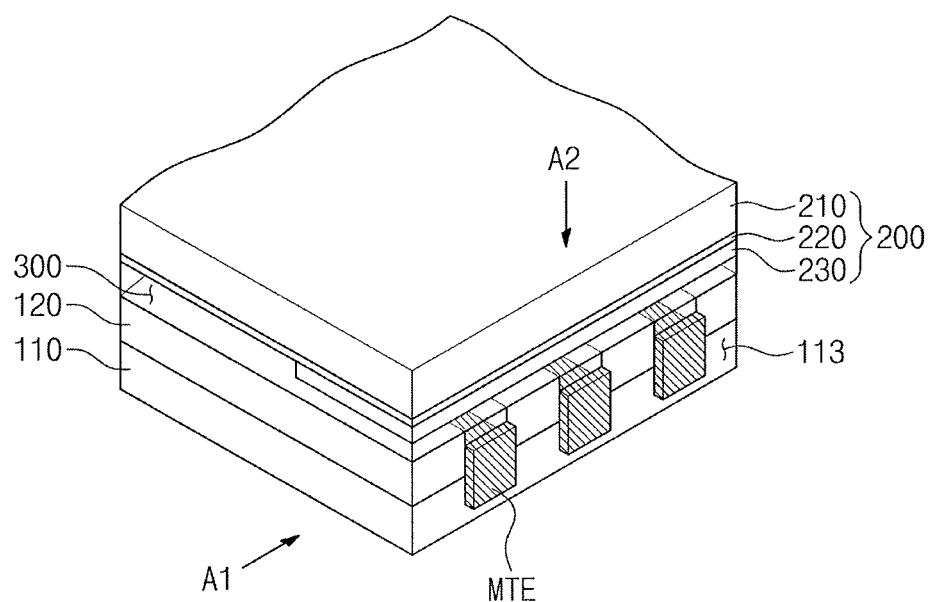
Figure 11C:
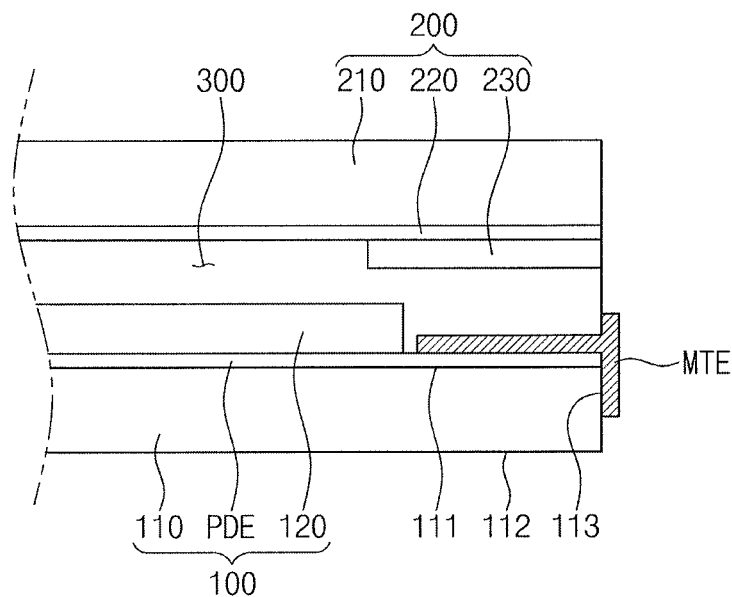

When the printing process is completed, the metal electrode MTE is formed on the top surface of the pad electrode PDE and the side surface 113 of the first substrate 110 as illustrated in FIGS. 10C and 11C. The metal electrode MTE may be formed by a photolithography process or a plating method in addition to the silk screen process.

Figure 10D:
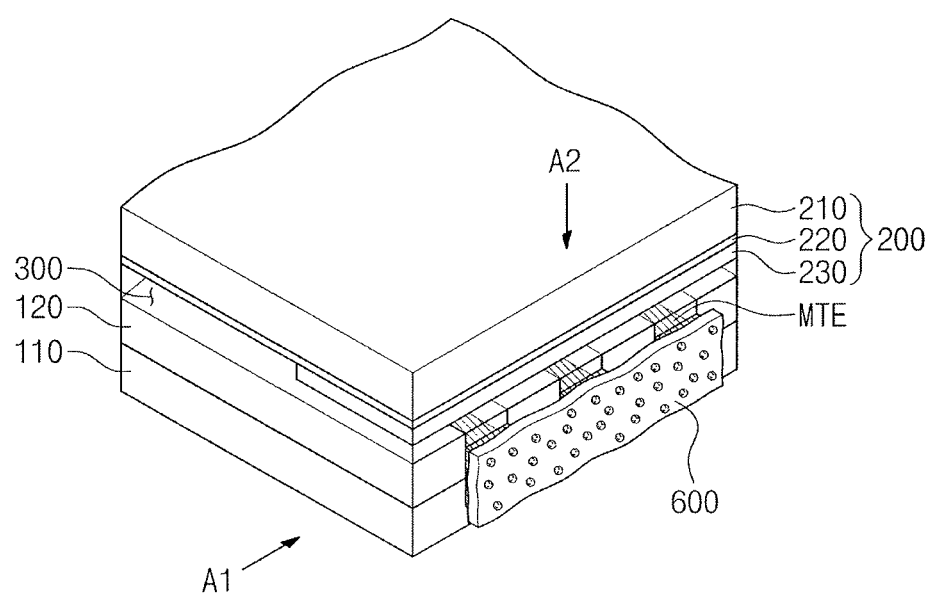
Figure 10E:
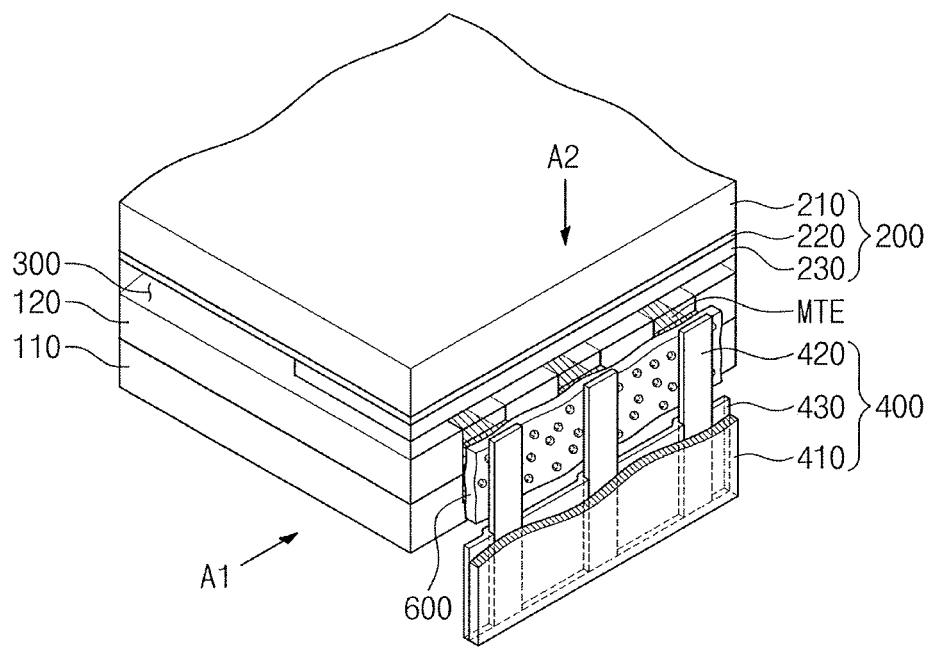
Figure 10F:
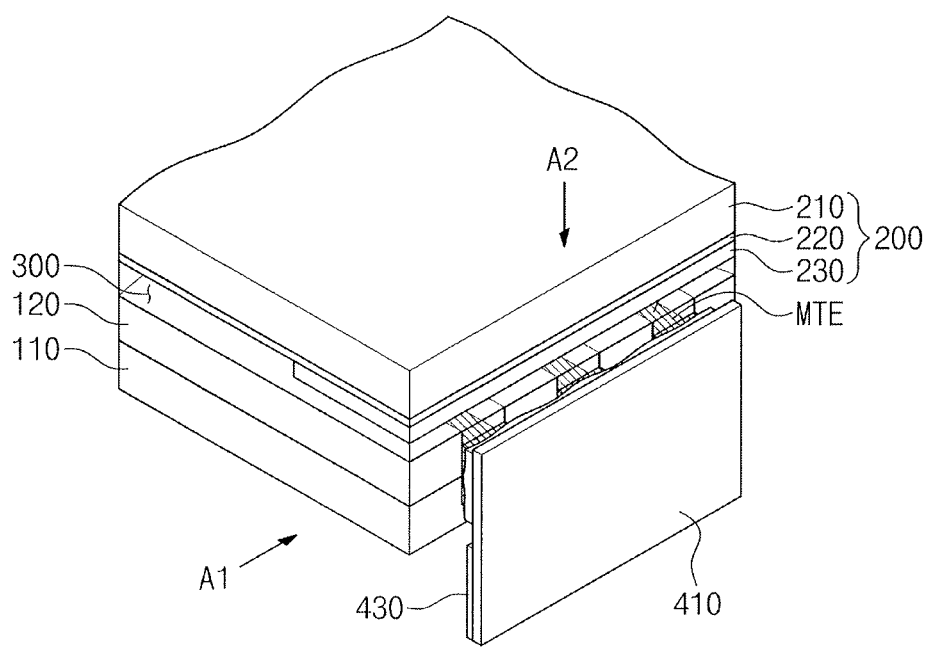
Figure 11D:
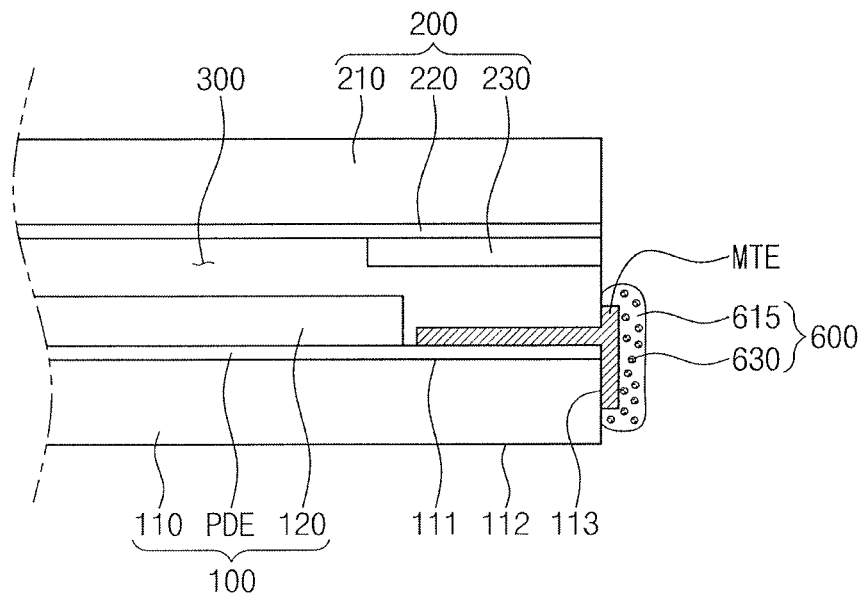
Figure 12A:
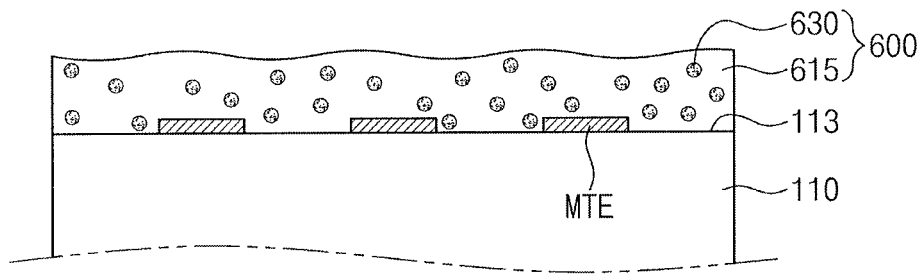
FIGS. 12A-12C illustrate plan views when
Figure 12B:
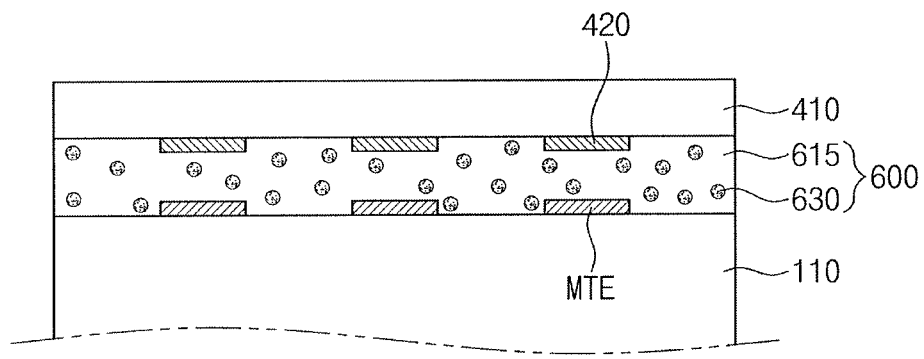
Figure 12C:
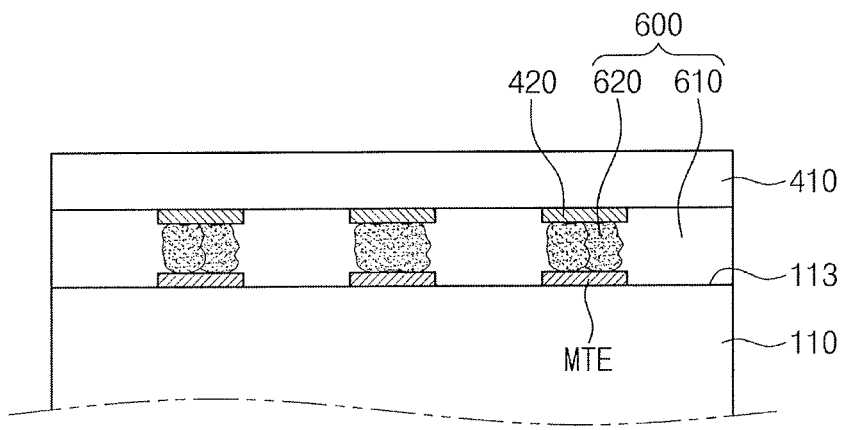

FIGS. 12A-12C illustrate plan views when FIGS. 10D-10F are viewed in a second direction A2. Referring to FIGS. 10D, 11D, and 12A, the conductive adhesion member 600 may be provided on the side surface of the display panel. The conductive adhesion member 600 may be provided, for example, by a dispensing method. In another embodiment, the conductive adhesion member 600 may be provided by a coating method, a dotting method, a screen printing method, or a slit coating method.

FIGS. 10D, 11D, and 12A illustrates an example in which the conductive adhesion member 600 is provided on the side surface of the display panel 350. For example, the conductive adhesion member 600 may be provided on the flexible film 400.

The conductive adhesion member 600 includes a base resin 615 and solder particles 630. The base resin 615 may be formed of a thermoplastic resin, e.g., an acrylic based resin, an epoxy based resin, or a urethane based resin. The solder particles 630 may include at least one of a tin-silver alloy, a tin-copper alloy, a tin-silver-copper alloy, a tin-bismuth alloy, a tin-zinc alloy, a tin-indium alloy, a tin-indium-bismuth alloy, or an indium-bismuth alloy.

In the solder particles 630 formed of the tin-bismuth alloy according to one example, the tin may be contained at a weight percentage ranging from about 37 wt % to about 47 wt % with respect to the total weight of conductive particles. The bismuth may be contained at a weight percentage ranging from about 53 wt % to about 63 wt % with respect to the total weight of conductive particles. For example, the tin and bismuth may be alloyed at a weight ratio ranging from about 37:63 to about 47:53. In one embodiment, the tin and bismuth may be alloyed at a weight ratio of about 42:58. The solder particles 630 may have a different composition in another embodiment.

The solder particles 630 are dispersed and provided in the base resin 615. The conductive solder particles 630 may have, for example, a globular shape or an oval shape before they are heated to be melted. The solder particles 630 may have an average diameter ranging from about 5 µm to about 20 µm. The diameter of the solder particles 630 may change according to a width of the metal electrode MTE. When the metal electrode MTE increases in width, the diameter of the solder particles 630 may have a relatively large value. When the metal electrode MTE decreases in width, the diameter of the solder particles 630 may have a relatively small value to prevent a short failure from occurring between the metal electrodes MTE.

Figure 11E:
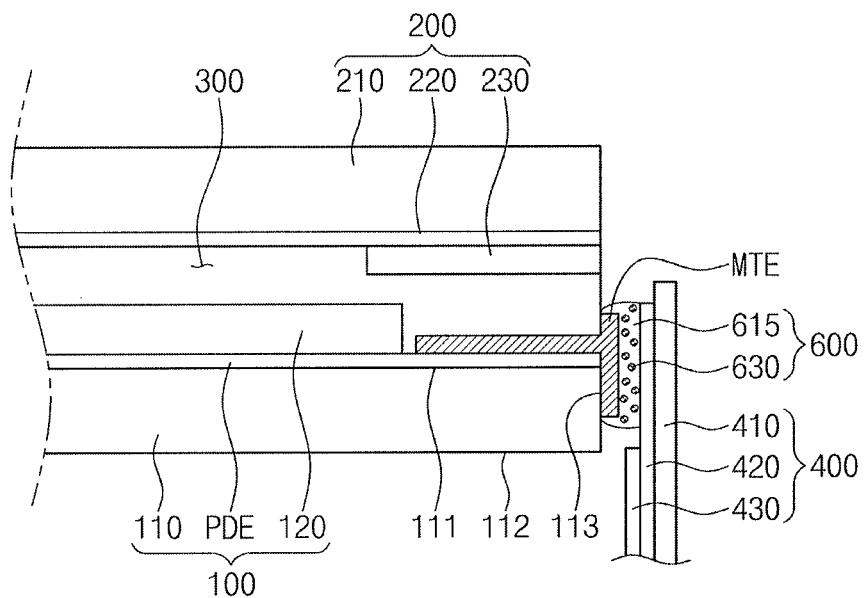
Figure 11F:
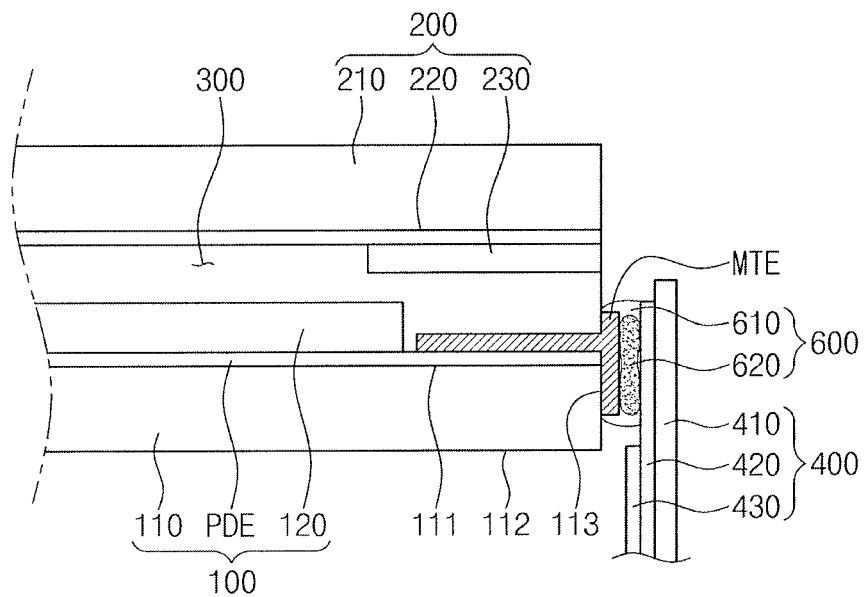

Referring to FIGS. 10E, 11E, and 12B, the conductive adhesion member 600 is provided on the surface of the display panel 350. Then, the flexible film 400 is aligned to the display panel 350. For example, the display panel 350 and the flexible film 400 are aligned to each other so that the metal electrode MTE of the display panel 350 is arranged in one-to-one correspondence with the line electrodes 420 of flexible film 400.

Then, heat at a temperature greater than the melting point of the solder particles 630 is provided when the flexible film 400 is aligned to the display panel 350. The thermal process may be performed at a temperature ranging, for example, from about 100° C. to about 250° C.

When the temperature of the thermal process is less than 100° C., the solder particles 630 are not melted. Thus, an electrical connection between the metal electrode MTE and the line electrode 420 may be not achieved. On the other hand, when the heat having a temperature greater than 250° C. is provided in the thermal process, the thermal decomposition may occur in the adhesion layer 610.

In addition, the temperature of the thermal process may be set differently according to the kinds of materials forming the solder particles 630. For example, when the solder particles includes tin-bismuth alloy, the melting point may have a temperature ranging from about 138° C. to about 200° C. The solder particles 630 may be melted by the provided heat. The melted solder particles 630 may surface-contact the metal electrode MTE or the line electrode 420. For example, the melted solder particles 630 may agglomerate at the metal electrode MTE or the line electrode 420. The connection electrode 620, which electrically connects the metal electrode MTE to the line electrode 420, is formed through the agglomerated solder particles 630. Therefore, the electrical connection is achieved between the flexible film 400 and the display panel 350.

The base resin 615 of the conductive adhesion member 600 may be polymerized and cross-linked by the provided heat. For example, the base resin 615 may be polymerized by the provided heat and transformed into a polymer resin, and a hardener may be added to perform the cross-linking reaction, thereby forming the adhesion layer 610. Therefore, the flexible film 400 may be physically fixed to the surface of the display panel 350 by the conductive adhesion member 600.

Figure 13:
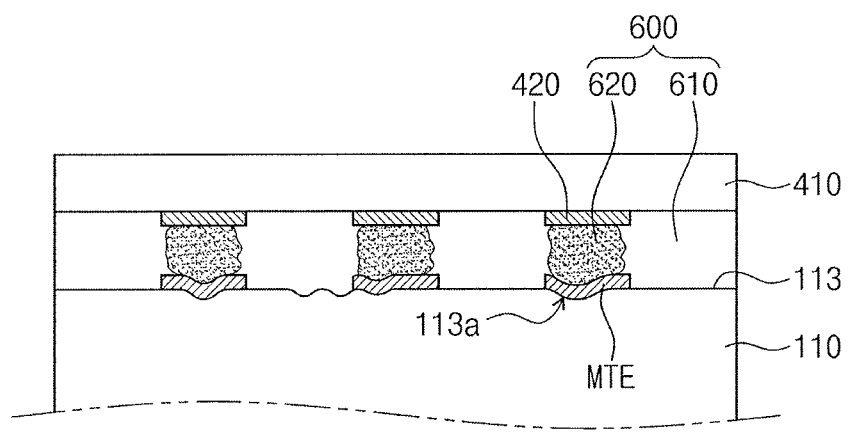
FIG. 13 illustrates an embodiment of an electrical connection between a line electrode of a flexible film and a metal electrode of a display panel when a chip occurs on a side surface of a first base substrate.

FIG. 13 illustrates an embodiment of an electrical connection of the line electrode of the flexible film and the metal electrode of the display panel when a chip 113A occurs on the side surface of the first base substrate. Referring to FIG. 13, the chip 113A may be formed on the side surface 113 of the first base substrate 110 for several reasons in a manufacturing process. The chip 113A may have, for example, a groove shape of various depths.

When the metal electrode MTE is formed on the side surface 113 on which the chip 113A is formed, the metal electrode MTE is formed along the profile of the chip 113A. Thus, the distance between the metal electrode MTE and the line electrode 420 of the flexible film 400 may increase due to the chip 113A.

When the metal electrode MTE and the line electrode 420 of the flexible film 400 are connected to each other using an anisotropic conductive film, an electrical contact failure between the two electrodes may occur at a position where the distance between the metal electrode MTE and the line electrode 420 abnormally increases. For example, sufficient pressure may not applied to conductive particles in the anisotropic conductive film to reduce electrical connection strength at a position where the distance between the metal electrode MTE and the line electrode 420 abnormally increases.

However, although the chip 113A exists on the side surface 113, the electrical connection may be normally achieved by the above described method, in which the solder particles 630 are melted to form the connection electrode 620 to electrically connect the metal electrode MTE to the line electrode 420.

Figure 14A:
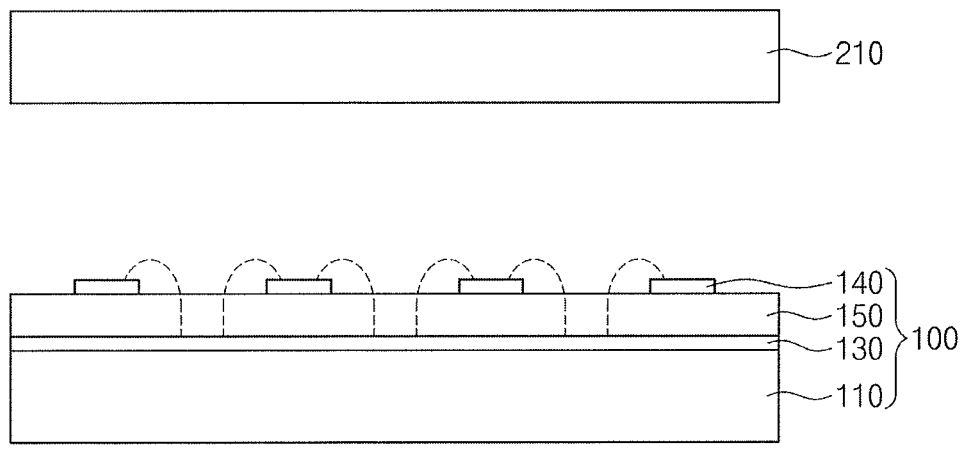
FIG. 14A illustrates a cross-sectional view of an embodiment of a horizontal electric field mode display device.
Figure 14B:
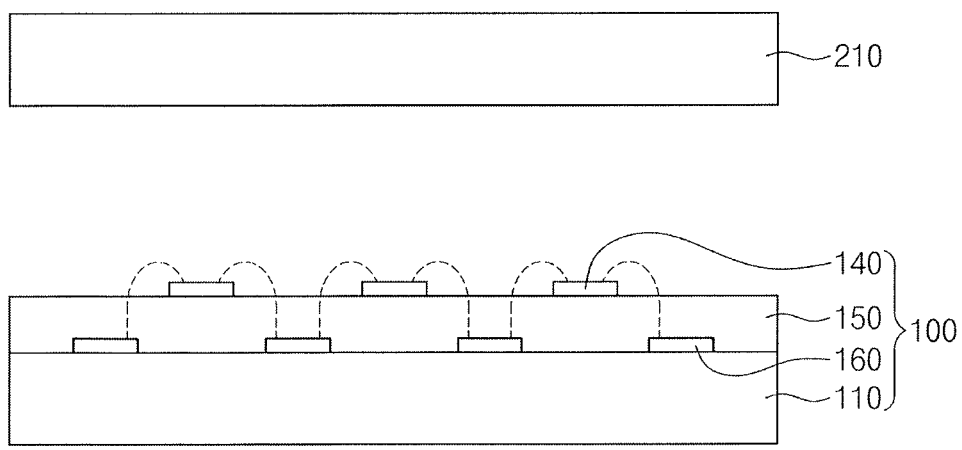
FIG. 14B illustrates another embodiment of a cross-sectional view of a horizontal electric field mode display device.

FIG. 14A is a cross-sectional view illustrating an embodiment of a horizontal electric field mode display device, and FIG. 14B is a cross-sectional view illustrating another embodiment of a horizontal electric field mode display device.

Referring to FIG. 14A, the horizontal electric field mode display device includes a first substrate 100 with a common electrode 130 and a pixel electrode 140. The second substrate 200 does not include an electrode. Thus, a horizontal electric field is generated on the first substrate 100. Molecules in the liquid crystal layer 300 may be arranged based on the horizontal electric field.

For example, the common electrode 130 is formed on the first base substrate 110, an insulation layer 150 is formed on the common electrode 130 to cover the common electrode 130, and the pixel electrode 140 is formed on the insulation layer 150. The pixel electrode 140 may have a structure which includes a plurality of branch electrodes spaced a predetermined distance from each other.

A reference voltage is applied on the common electrode 130, and a pixel voltage is applied on the pixel electrode 140. Thus, an electric field is generated by a voltage difference of the reference voltage and the pixel voltage between the common electrode 130 and the pixel electrode 140. The electric field arranges liquid crystal molecules of the liquid crystal layer 300 between the first and second substrate 100 and 200.

Referring to FIG. 14B, the horizontal electric field mode display device includes a first substrate 100 with a common electrode 160 and a pixel electrode 140. A second substrate 200 does not include an electrode. Thus, in this embodiment, the horizontal electric field is also generated on the first substrate 100 in the display device.

However, while the common electrode 130 are formed on the entire surface in the first embodiment, the common electrode 160 has a structure where a plurality of parallel electrodes are spaced a predetermined distance from each other. Each of the parallel electrodes may be between two adjacent branch electrodes. In addition to structures in FIGS. 14A and 14B, any structure for generating a horizontal electric filed is applicable.

Figure 15:
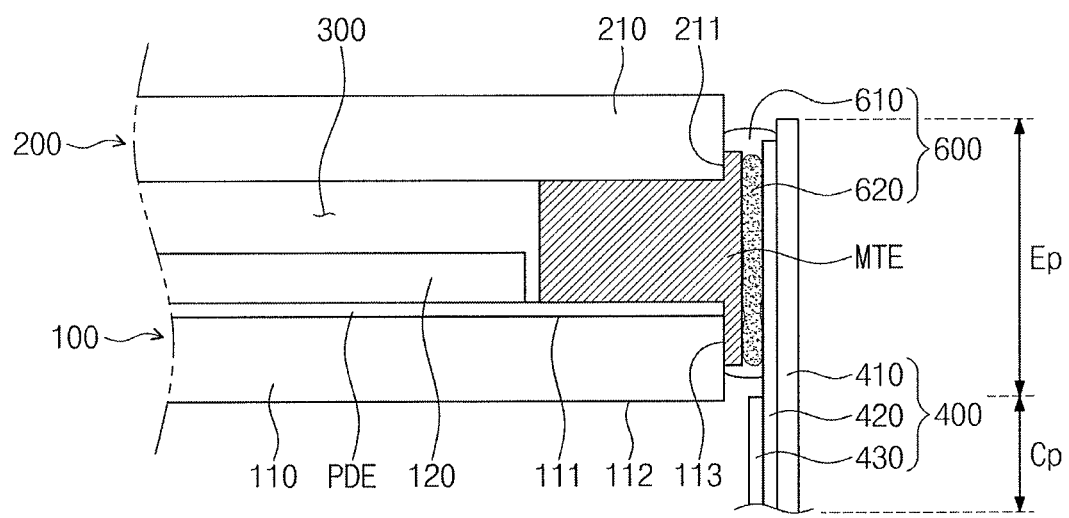
FIG. 15 illustrates, in cross-section, an embodiment of a coupled structure of a display panel and a flexible film in a display device which operates in a horizontal electric field alignment mode.

FIG. 15 is a cross-sectional view illustrating an embodiment of a coupled structure of a display panel and a flexible film in a display device which operates in a horizontal electric field alignment mode. Referring to FIG. 15, the flexible film 400 may have one end attached to the surface of the display panel 350 and the other side attached to the printed circuit board 500. In the current embodiment, the side surface of the display panel 350 may include the side surface of the first substrate 100 and the side surface of the second substrate 200.

According to another embodiment, a metal electrode MTE is formed on the side surface 113 of the first substrate 100 and a side surface 211 of the second substrate 200. For example, although the metal electrode MTE is formed on the side surface of only the first substrate 100 in the display device in which the common electrode 210 in FIGS. 3 and 4 is provided on the second substrate 200, the metal electrode MTE is formed on the side surfaces 113 and 211 of the first and second substrates 100 and 200 in the display device which operates in the horizontal electric field mode.

The metal electrodes MTE extends to a space between the first and second substrates 100 and 200 to directly contact the pad electrode PDE on the first base substrate 110 of the first substrate 100. Although the pad electrode PDE is partially covered by the insulation layer 120, an end of the pad electrode PDE is exposed through the opening pattern on the insulation layer 120, and the end of the pad electrode PDE exposed through the opening pattern contacts the metal electrode MTE.

The flexible film 400 may be parallel to the side surfaces 113 and 211 of the first and second substrates 100 and 200. The flexible film 400 includes the base film 410, the line electrode 420 on the base film 410, and the cover film 430 for covering the line electrode 420. The base film 410 of the flexible film 400 is divided into a central section CP facing the cover film 430 and an end section EP not facing the cover film 430. The end section EP corresponds to the side surface 113 of the first substrate 100 and the side surface 211 of the second substrate 200. The line electrode 420 is formed on the central section CP and the end section EP. The conductive adhesion member 600 is disposed to correspond to the end section EP of the base film 410.

Thus, the flexible film 400 may be attached on the side surfaces 113 and 211 of the first and second substrates 100 and 200. Since the flexible film 400 is physically fixed to the surfaces 113 and 211 of the display panel 350, an adhesion portion may increase in area. As a result, the adhesion force may be reinforced when compared with the embodiment in which the metal electrode MTE is formed on only the side surface 113 of the first substrate 100 as in FIGS. 3 and 4. Also, when the metal electrode MTE extends to the side surfaces 113 and 211 of the first and second substrates 100 and 200, a contact area between the metal electrode MTE and the line electrode 420 may increase.

According to the present embodiment, a lateral bonding structure is designed to reduce the size of the bezel area of the display device. This may improve electrical connection reliability between the flexible film and the display panel using the conductive adhesion member including solder particles.

In accordance with one or more of the aforementioned embodiments, a method for manufacturing a display device, heat at a temperature greater than the melting temperature of the solder particles may be applied to the conductive adhesion member between the flexible film and the display panel. As a result, electrical connection between the flexible film and the display panel may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A display device, comprising:
a display panel including a first substrate which includes a signal line, a pad electrode connected to the signal line, and a second substrate facing the first substrate;
a metal electrode electrically connected to the pad electrode, the metal electrode being on a side surface of the display panel;
a flexible film including a line electrode electrically connected to the metal electrode, the flexible film being attached to the side surface of the display panel;
a connection electrode directly contacting and electrically connecting the metal electrode to the line electrode, wherein the connection electrode includes solder particles in melted form; and
an adhesion layer having adhesion property and being disposed between the flexible film and the side surface of the display panel, wherein:
the connection electrode is disposed on the side surface of the display panel and is apart from the pad electrode in a plan view,
each of the metal electrode and the line electrode is not overlapped with a side surface of the second substrate along a direction perpendicular to the side surface of the second substrate, and
the adhesion layer is extended to the side surface of the second substrate and disposed between the side surface of the second substrate and the flexible film.

2. The display device as claimed in claim 1, wherein the metal electrode includes a metallic material including silver or carbon.

3. The display device as claimed in claim 1, wherein the solder particles include at least one of a tin-silver alloy, a tin-copper alloy, a tin-silver-copper alloy, a tin-bismuth alloy that consists entirely of tin and bismuth, a tin-zinc alloy, a tin-lead alloy, a tin-lead-silver alloy, a tin-bismuth-silver alloy, or a tin-indium alloy.

4. The display device as claimed in claim 3, wherein
the solder particles include the tin-bismuth alloy,
the tin is in a weight percentage ranging from about 37 wt % to about 47 wt % with respect to a total weight of the solder particles,
the bismuth is in a weight percentage ranging from about 53 wt % to about 63 wt % with respect to the total weight of the solder particles, and
a combined weight percentage of the tin and the bismuth in the tin-bismuth alloy being 100% with respect to the total weight of the solder particles.

5. The display device as claimed in claim 1, wherein
the first substrate includes a first base substrate having a first surface opposite to a second surface and side surfaces connecting the first and second surfaces,
the signal line and the pad electrode are on one of the first surface and the second surface, and
the metal electrode directly contacts the pad electrode.

6. The display device as claimed in claim 1, wherein the flexible film includes:
a base film on which the line electrode is disposed; and
a cover film covering the line electrode.

7. The display device as claimed in claim 6, wherein
the base film includes a first section corresponding to a side surface of the first substrate and a second section corresponding to a side surface of the second substrate and outside the first section, and
the line electrode is in the first section and does not extend to the second section.

8. The display device as claimed in claim 7, wherein
the adhesion layer attaches the base film to the side surface of the display panel,
the connection electrode is disposed corresponding to the first section of the base film, and
the adhesion layer is disposed corresponding to the first and second sections of the base film.

9. The display device as claimed in claim 1, wherein the second substrate further includes:
a second base substrate;
a common electrode on the second base substrate; and
an insulation structure on the common electrode and adjacent to the metal electrode to extend along the side surface of the display panel.

10. The display device as claimed in claim 1, wherein
the second substrate includes a second base substrate and a common electrode on the second base substrate, and
the common electrode does not overlap the metal electrode between the first and second substrates.

11. The display device as claimed in claim 1, wherein
the first substrate includes an insulation layer on the pad electrode,
the insulation layer includes an opening pattern overlapping and exposing a top surface of an end of the pad electrode, and
the metal electrode contacts the top surface of the end of the pad electrode through the opening pattern.

12. The display device as claimed in claim 11, wherein
the metal electrode, the opening pattern, and the pad electrode are provided as a plurality of metal electrodes and opening patterns arrayed in a direction, top surfaces of the plurality of pad electrodes being respectively overlapped with the plurality of the opening patterns, and
the plurality of the metal electrodes respectively contact the top surfaces of the pad electrodes.

13. The display device as claimed in claim 11, wherein the metal electrode fills the opening pattern, the metal electrode being formed from a conductive paste injected into the opening pattern.

* * * * *